United States Patent
Schüle

(10) Patent No.: US 6,817,342 B2
(45) Date of Patent: Nov. 16, 2004

(54) METHOD AND DEVICE FOR DETECTING THE QUALITY OF FUEL FOR AN INTERNAL COMBUSTION ENGINE

(75) Inventor: Harry Schüle, Neunburg V. Wald (DE)

(73) Assignee: Siemens Aktiengesellschaft, Munich (DE)

( * ) Notice: Subject to any disclaimer, the term of this patent is extended or adjusted under 35 U.S.C. 154(b) by 125 days.

(21) Appl. No.: 10/176,821

(22) Filed: Jun. 20, 2002

(65) Prior Publication Data

US 2003/0005754 A1 Jan. 9, 2003

(30) Foreign Application Priority Data

Jun. 20, 2001 (DE) .......................................... 101 29 776

(51) Int. Cl.[7] .......................... F02D 41/34; G01N 33/22
(52) U.S. Cl. ..................... 123/486; 73/61.77; 123/491; 123/494
(58) Field of Search .................. 123/478, 480, 123/486, 494; 73/61.76, 61.77

(56) References Cited

U.S. PATENT DOCUMENTS

| | | | |
|---|---|---|---|
| 3,824,967 A | * 7/1974 | Gordon ..................... 123/485 |
| 4,271,811 A | * 6/1981 | Suzuki et al. ............... 123/698 |
| 5,477,832 A | 12/1995 | Visser ......................... 123/491 |
| 6,079,396 A | * 6/2000 | Ament et al. ............... 123/674 |

FOREIGN PATENT DOCUMENTS

| | | |
|---|---|---|
| DE | 40 27 947 A1 | 3/1992 |
| DE | 197 53 702 A1 | 9/1999 |
| JP | 11-13568 | * 1/1999 |

\* cited by examiner

*Primary Examiner*—Tony M. Argenbright
(74) *Attorney, Agent, or Firm*—Laurence A. Greenberg; Werner H. Stemer; Ralph E. Locher

(57) ABSTRACT

A wall film can form around a temperature sensor as a result of the temperature sensor being fitted in the intake port of the internal combustion engine, in such a manner that at least some of the fuel jet from the injection valve is sprayed onto it. The reduction in temperature that occurs as a result of the enthalpy of vaporization at the temperature sensor is measured and used as a criterion for determining the quality of the fuel supplied to the internal combustion engine. This information can be used to correct the change in injection time exclusively or in addition to adapting the starting quantity and/or using the lack-of-smoothness method.

10 Claims, 4 Drawing Sheets

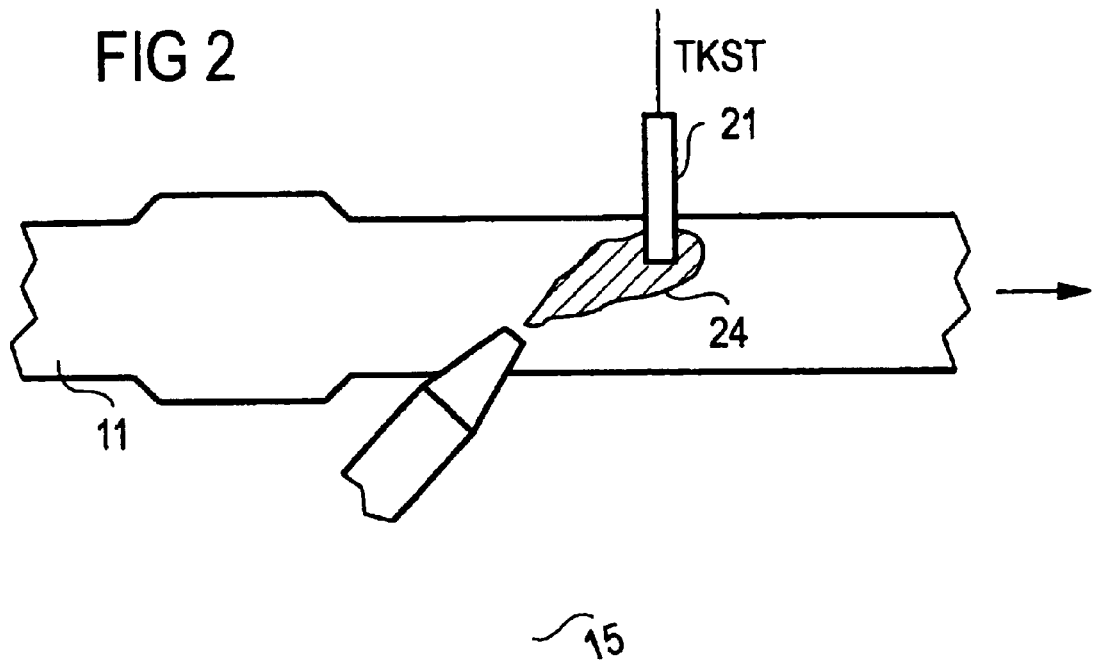
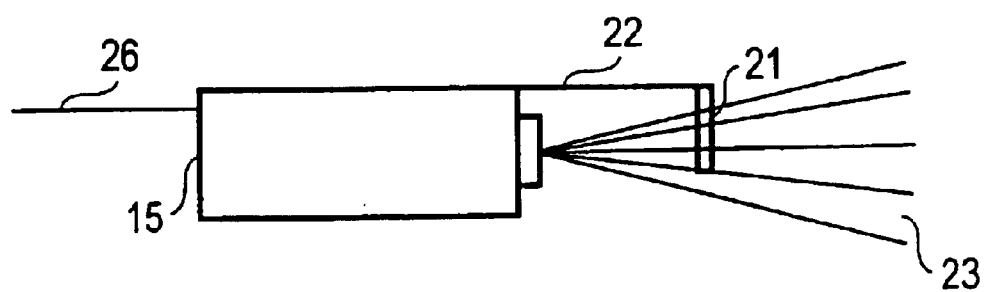

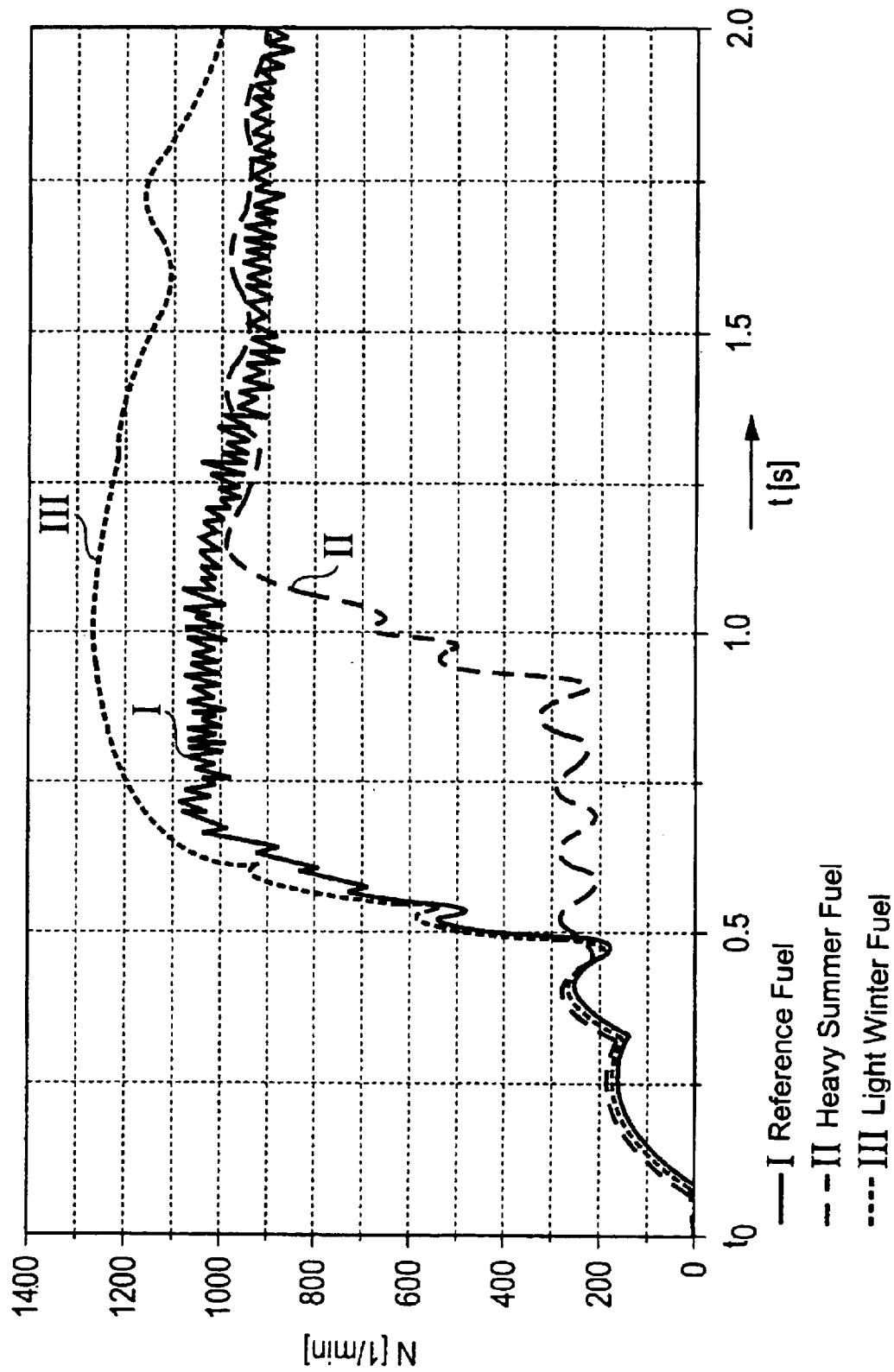

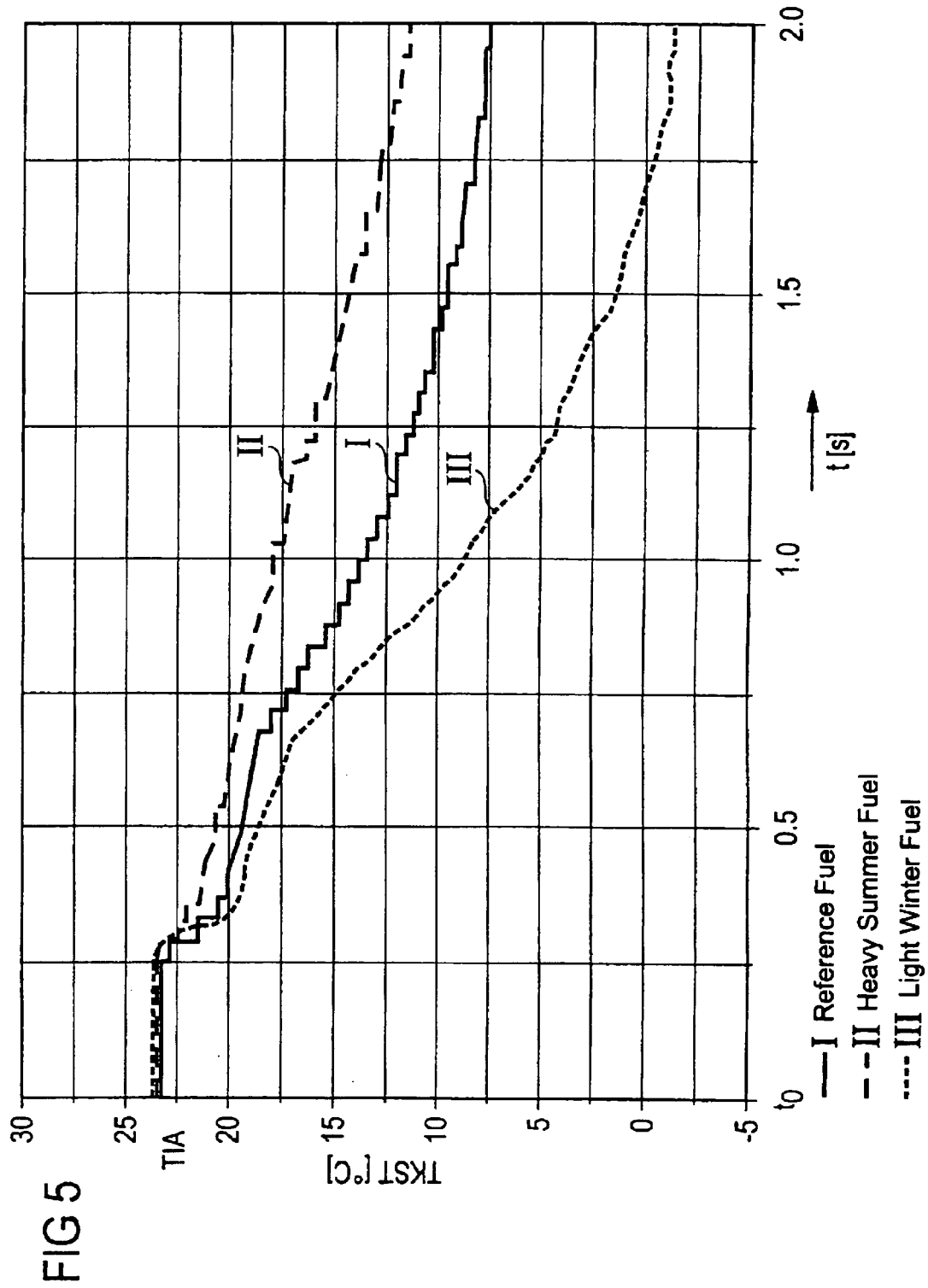

METHOD AND DEVICE FOR DETECTING THE QUALITY OF FUEL FOR AN INTERNAL COMBUSTION ENGINE

BACKGROUND OF THE INVENTION

Field of the Invention

The invention relates to a method and a device for detecting the quality of fuel for an internal combustion engine.

Fuels for internal combustion engines consist of a mixture of hydrocarbon compounds that may contain additions of oxygen-containing organic components and additives in order to improve the properties.

The proportions of the various hydrocarbons in the fuel result in different effects on the operating performance of the internal combustion engine; in particular, starting performance, smooth running, output, fuel consumption, acoustics and exhaust emissions are influenced. Modern internal combustion engines have to be able to process fuels of varying quality without the operating performance being noticeably impaired.

The quality of the fuel that is fed to an internal combustion engine therefore has a significant influence on the combustion operation and on the exhaust emissions, in particular during a cold start of the internal combustion engine.

Currently, changes in the quality of fuel are detected with the aid of what is known as a starting mix adaptation or the lack-of-smoothness method and are compensated for by changing the injection times. In the known methods, an increase in speed when the internal combustion engine is started or the fluctuations in the speed when the engine is being started is evaluated. If the increase in speed or the fluctuations in speed do not lie within a permitted, predetermined confidence interval, the injection time is corrected accordingly. However, the extent of correction is calculated relatively inaccurately, and consequently under certain circumstances the correction will be excessive. Particularly in the case of what is known as a "bad start", the injection time is changed in such a manner that the fuel/air mix becomes richer, and consequently the fuel/air mix can become too rich after refueling with a very good quality of fuel. The internal combustion engine will then only start with difficulty or will no longer start at all. Furthermore, there is a risk of the undesired speed characteristics having been caused not by a changed quality of fuel, but rather by other fault sources.

Published, Non-Prosecuted German Patent Application DE 40 27 947 A1 has described various methods that can be used to take account of changes in the fuel quality. First of all, each time the vehicle driven by the internal combustion engine is refueled, the control deviation can be measured in the lambda control circuit and an adaptation value can be adjusted in such a way that the determined control deviation disappears. The method has the drawback that it only works when the lambda control is active, which, however, is not the case in particular in the case of cold internal combustion engines. Second, methods have been proposed which ensure that the internal combustion engine is able to operate even when cold if the fuel composition changes significantly during refueling, for example as a result of a tank which contains fuel having been run almost to empty, followed by refueling with a fuel which contains predominantly methanol. The tank levels before and after refueling and the data available on commercially available fuels are used to estimate what fuel compositions could be present. The pilot control values are then changed for operation of the internal combustion engine with fuels of the possible compositions, and checks are carried out on the basis of the composition with which the internal combustion engine runs best. The values are then used to control the internal combustion engine further.

SUMMARY OF THE INVENTION

It is accordingly an object of the invention to provide a method and a device for detecting the quality of fuel for an internal combustion engine that overcomes the above-mentioned disadvantages of the prior art devices and methods of this general type, which can be used to detect the quality of the fuel which is to be supplied for combustion to an internal combustion engine in a simple and inexpensive way.

With the foregoing and other objects in view there is provided, in accordance with the invention, a method for detecting a quality of a fuel supplied to an internal combustion engine. The method includes directing onto a temperature sensor at least some of the fuel injected by an injection valve into an induction pipe of an intake port of the internal combustion engine so that a wall film is formed around the temperature sensor; determining a reduction in temperature that occurs as a result of an enthalpy of vaporization; and determining the quality of the fuel from the reduction in temperature.

Installing the temperature sensor in the induction pipe of the internal combustion engine in such a manner that at least some of the fuel jets from the injection valve is sprayed onto it allows a wall film to form around the temperature sensor. The reduction in temperature that occurs as a result of the enthalpy of vaporization at the temperature sensor is measured and is used as a criterion for the quality of the fuel supplied to the internal combustion engine.

With the aid of this information, it is possible to formulate a change in the injection time exclusively or in addition to the adaptation of the starting quantity or the lack-of-smoothness method.

The method according to the invention or the device has the advantage that the quality of fuel used can in a simple way be recorded very quickly by measurement technology, immediately after the first injections of fuel after the internal combustion engine has been started. There is no need for any values to be stored in the control unit, so that it is possible to rule out complications resulting from refueling operations and changes in fuel quality.

The quantity of the wall film in the induction pipe can also be determined by measurement technology during ongoing operation and in the event of dynamic load states, so that the lambda window for the lambda control can be reduced. The quantity of fuel that can be applied in the time before the lambda control is active can be reduced by reliable detection of the fuel quality. As a result, the emissions of HC and CO decrease.

The use of a temperature sensor disposed in the fuel jet makes it possible to estimate the fuel temperature, with the result that further engine management improvements and diagnoses, such as the diagnosis of an evaporation retention system and an exhaust gas recirculation system, are assisted. Moreover, as a result the filling can be calculated more accurately in what is known as an induction-pipe filling model.

The signal from the temperature sensor can also be used for diagnosis of the injection valve. A defective injection valve can easily be detected by a plausibility test carried out on the signal output from the internal combustion engine control unit for opening the nozzle of the injection valve and on the signal from the temperature sensor. If there is an activation signal for the injection valve and the signal at the temperature sensor does not change, it is possible to conclude that no fuel has reached the temperature sensor and therefore no fuel has been injected. The reason for this may, for example, lie in a closed, jammed injection valve. The fault can be input into a fault memory and/or indicated to the driver.

In accordance with an added mode of the invention, there is the step of using values of the reduction in temperature as input variables for a characteristic diagram in which associated values for a correction factor are stored. The correction factor is taken into account in a calculation of an injection time of the internal combustion engine.

In accordance with an additional mode of the invention, there is the step of obtaining the reduction in temperature by comparing a first temperature in the intake port of the internal combustion engine and a second temperature at the temperature sensor after the fuel has been injected.

In accordance with a further mode of the invention, there is the step of measuring the first temperature in the intake port of the internal combustion engine using a further temperature sensor.

In accordance with another mode of the invention, there is the step of measuring the first temperature in the intake port before the internal combustion engine is started; measuring the second temperature using the temperature sensor after injection has taken place; calculating the reduction in temperature from a difference between the first temperature and the second temperature; and reading-out the associated values for the correction factor from the characteristic diagram in dependence on the values for the reduction in the temperature and a time since the internal combustion engine was started.

In accordance with another added mode of the invention, during steady-state operation of the internal combustion engine, the first temperature in the intake port is measured. The second temperature is measured using the temperature sensor after injection has taken place. The reduction in temperature is calculated from a difference between the first temperature and the second temperature, and the associated values for the correction factor are read-out from the characteristic diagram in dependence on the reduction in temperature and a load on the internal combustion engine.

With the foregoing and other objects in view there is provided, in accordance with the invention, a device for detecting a quality of fuel supplied to the internal combustion engine. The engine has an intake port with an induction pipe, and the induction pipe is assigned an injection valve for injecting fuel, so that the fuel can be injected into the induction pipe. The device contains a temperature sensor disposed in the induction pipe, in such a manner that while the fuel is being injected, at least some of the fuel strikes said temperature sensor.

In accordance with an added feature of the invention, the internal combustion engine is a multi-cylinder internal combustion engine having a plurality of induction pipes corresponding to a number of injection valves, and the temperature sensor is one of a plurality of temperature sensors with a respective one of the temperature sensors disposed in each of the induction pipes.

In accordance with another feature of the invention, the internal combustion engine is a multi-cylinder internal combustion engine-having a plurality of induction pipes corresponding to a number of injection valves, and the temperature sensor is disposed in only one of the induction pipes.

In accordance with another feature of the invention, the injection valve and the temperature sensor are combined to form a structural unit.

In accordance with a further feature of the invention, the injection valve has a holder which extends in a direction of a fuel jet from the injection valve and is angled off at a free end, to which the temperature sensor is secured.

In accordance with a concomitant feature of the invention, connection lines are provided functioning as common connection lines connected to both the injection valve and the temperature sensor.

Other features which are considered as characteristic for the invention are set forth in the appended claims.

Although the invention is illustrated and described herein as embodied in a method and a device for detecting the quality of fuel for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic, detailed illustration of a device according to the invention;

FIG. 3 is a diagrammatic illustration of a preferred exemplary embodiment in which a fuel injection valve and a temperature sensor are combined to form a single unit;

FIG. 4 is a graph illustrating a time curve of a rotational speed during starting for various qualities of fuel; and FIG. 5 is a graph illustrating the time curve of a temperature at the intake valve for different qualities of fuel.

DESCRIPTION OF THE PREFERRED EMBODIMENTS

Figure 1:
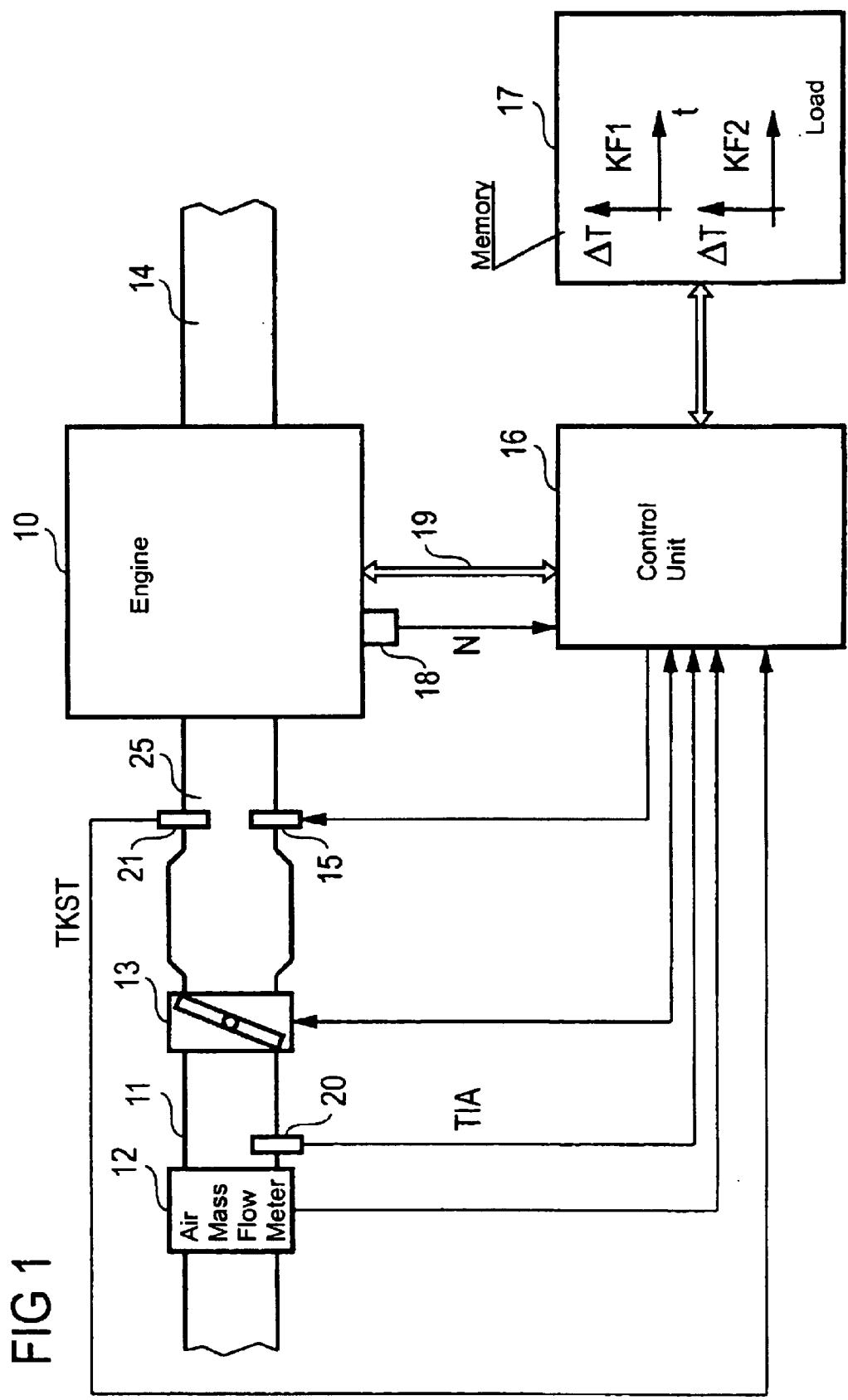
FIG. 1 is a block diagram of an internal combustion engine with an associated control unit, in which a method according to the invention is employed.

Referring now to the figures of the drawing in detail and first, particularly, to FIG. 1 thereof, there is shown a highly simplified illustration, in the form of a block diagram, of an internal combustion engine 10 with an associated control unit 16. The figure illustrates only those components that are required in order to gain an understanding of the invention. In particular, the fuel circuit and the exhaust-gas aftertreatment device have not been illustrated.

The air required for combustion is fed to the internal combustion engine 10 via an intake port 11. In the intake port 11, there are disposed, in succession as seen in the direction of flow of the intake air, an air mass flow meter 12, a temperature sensor 20 for the intake air temperature TIA and a throttle valve 13. On an output side, the internal combustion engine 10 is connected to an exhaust pipe 14. The internal combustion engine 10 is assigned a fuel injection system that is supplied in a known way by fuel from a fuel tank by a fuel pump and via a fuel line. The fuel injection system has a plurality of injection valves 15, only one of which is illustrated in FIG. 1. Each cylinder of the internal combustion engine 10 is assigned a dedicated injection valve 15, the individual injection valves injecting fuel into the induction pipes, which lead to the cylinders, of the intake port 11 of the internal combustion engine 10.

In the case of an internal combustion engine 10 that is controlled on the basis of the air mass flow, the air mass flow meter 12 serves as a load sensor. As an alternative to the air mass flow meter 12, it is also possible for a pressure sensor that is disposed in the intake port 11 of the internal combustion engine 10 to be used as the load sensor. The throttle valve 13 is, for example, a throttle member which is controlled by electric motor (electric throttle) and the opening cross section of which, in addition to actuation by the driver (wish of the driver), can be adjusted as a function of the operating range of the internal combustion engine 10 by signals from a control unit 16 which controls the internal combustion engine 10. Electronic control units 16 of this type, which generally include one or more microprocessors and in addition to the injection of fuel are also responsible for a wide range of further control tasks, are known per se, and consequently only the structure which is of relevance in connection with the invention and the method of operation thereof will be dealt with below. In particular, the control unit 16 is connected to a memory device 17, in which, inter alia, various characteristic diagrams are stored, the importance of which is explained below.

A speed of the internal combustion engine 10 is recorded with the aid of a speed sensor 18, which outputs a corresponding signal N to the control unit 16. To control the internal combustion engine 10, the control unit 16 is also connected via a data and control line 19 to further sensors and actuators, which are not specifically illustrated.

In conventional internal combustion engines, the quantity of fuel that is required for one combustion cycle is injected into the induction pipe of the intake port 11 during a single injection operation. During the vaporization of the fuel droplets, heat is extracted from the individual droplets themselves and from the surrounding air. The resulting reduction in temperature can be estimated as follows:

$$\Delta T = \frac{m_{gas} \times r_{gas}}{m_{air} \times cp_{air} - m_{gas} \times cp_{gas}} \quad (1)$$

For an internal combustion engine with four cylinders and a capacity of two liters, the following values can be used, by way of example, for a specific fuel:

$m_{air}$=5.94 $10^{-4}$ kg at 20° C. and 1.0 bar
$cp_{air}$=1.0 kJ/(kgK)
$cp_{gas}$=2.2 kJ/(kgK)
$r_{gas}$=380 kJ/kg
$m_{gas}$=153 $10^{-6}$ kg where $m_{air}$ denotes the mass of air, $m_{gas}$ denotes the mass of fuel, $cp_{air}$ denotes the specific heat of the air, $cp_{gas}$ denotes the specific heat of the fuel and $r_{gas}$ denotes the enthalpy of vaporization of the fuel.

With these values, according to equation (1), the result would be a reduction in temperature of $\Delta T$=225 K. This unrealistic reduction in temperature denotes that a large proportion of the injected fuel will not be vaporized, but rather will be deposited as a wall film. The quantity of fuel vaporized in the induction pipe is dependent on the composition of the fuel. For this reason, a winter fuel with a high proportion of highly volatile hydrocarbons will also readily be vaporized in the induction pipe and will therefore generate a greater reduction in temperature than a summer fuel with low levels of highly volatile hydrocarbons. The reduction in temperature that is established can therefore be used as a measure of the quality of the fuel supplied to the internal combustion engine.

Therefore, according to the invention, in the intake section 11, i.e. in the induction pipes leading to the individual cylinders, temperature sensors 21 corresponding to the number of cylinders of the internal combustion engine 10 provided in the vicinity of the intake valves, in such a manner that they lie in the spray region of the individual injection valves 15 and consequently clouds of fuel 24 which are formed also reach the temperature sensors 21. A configuration of this type is illustrated in more detail in FIG. 2. The reduction in temperature is dependent on the geometry, the surface area and the heat capacity of the temperature sensor 21. In particular, the wall thickness of the temperature sensor 21 should be relatively low, in order to ensure a short response time.

If the injection valves 15 are then actuated via signals from the control unit 16, at least some of the injected fuel strikes the temperature sensors 21 during the opening time, and a wall film can form around the temperature sensors 21. The reduction in temperature caused by the evaporation enthalpy is determined with the aid of the temperature sensors 21, and the fuel quality is estimated therefrom.

However, the method according to the invention and the device can also be employed in an internal combustion engine 10 with what is known as central injection (signal point injection (SPI)), in which a single injection valve is provided in the intake port 11 for all the cylinders of the internal combustion engine 10. In this case, there is also only one temperature sensor 21 required, and this then lies in the injection region of the central injection valve.

Moreover, it is also possible for there to be only one temperature sensor 21, disposed in the spray region of any selected injection valve, to be provided even when using what is known as multipoint injection, in which there is an injection valve for each cylinder, this variant leading to a very inexpensive device.

A particularly simple and inexpensive device results if in each case one temperature sensor 21 and one injection valve 15 are combined to form a single structural unit, as is diagrammatically illustrated in FIG. 3. In this configuration, there is a holder 22 on the injection valve 15, which holder extends, for example, in the direction of the fuel jet and is angled off at its free end, so that the temperature sensor 21 is secured at that location, in such a manner that it is at least partly surrounded by a fuel jet 23. By a configuration of this type, the temperature sensor 21 is fixed permanently and accurately relative to the injection valve 15. Moreover, the cabling is simplified, since in addition to the connections for the injection valve 15, only one additional line is required for the temperature sensor 21, and furthermore this can be integrated in the line section for the injection valve 15.

FIG. 4 shows a graph that plots the relationship between a rotational speed N and a time t for an internal combustion engine that is started using different fuels of different qualities at time $t_0$. Reference I denotes a speed curve that is established when a reference fuel is used. If the internal combustion engine is operated using a "heavy" summer fuel, a speed curve as illustrated by curve II is established. If a "light" winter fuel is used, a speed curve corresponding to curve III is established. Since the quantity of fuel that is vaporized is crucial for warming up of the internal combustion engine, since only the vaporized fuel contributes to combustion, the poor speed curve results for the "heavy" summer fuel with smaller amounts of volatile hydrocarbons. The internal combustion engine only reaches its idling speed relatively late.

FIG. 5 shows a graph plotting the relationship between a temperature TKST at the intake valve and the time t for an internal combustion engine that is started using different fuels of different qualities at time $t_0$. Reference symbol I denotes the temperature curve that is established when a reference fuel is used. If the internal combustion engine is operated with a "heavy" summer fuel, a temperature curve as illustrated by curve II is established. If a "light" winter fuel is used, a temperature curve as illustrated by curve III is established.

The following text explains how the reduction in temperature caused by the enthalpy of vaporization can be used to estimate the quality of fuel and how this quality can be taken into account when determining the injection time for the injection valves of the injection device.

A basic injection time TI_B, which is formed by the control unit 16 from a load signal (air mass or induction pipe pressure) and the speed N, is acted on by a plurality of correction variables depending on the operating state of the internal combustion engine. The correction variables may act on the basic injection time TI_B either by multiplication or by addition. One correction variable may be what is known as a starting mix adaptation FAC_TI_ST_AD. The correction variable is selected as a function of the increase in speed when the internal combustion engine is started and/or the fluctuations in speed that occur during starting. In the following example, the correction variable is linked by multiplication, as a correction factor FAC_TI_ST_AD, to the basic injection time TI_B $$TI=TI\_B*FAC\_TI\_ST\_AD*\ldots, \quad (2)$$

where TI denotes a total injection time and further correction variables are omitted.

The value of the correction variable is preferably in the range between 0.9 (depletion of the mix) and 1.2 (enrichment of the mix). A further correction variable, namely the factor FKST, which takes account of the fuel quality and is likewise incorporated in equation (2) by multiplication, is obtained by evaluating the temperature TIA in the intake port and the temperature TKST at the temperature sensor 21.

For this purpose, before the internal combustion engine 10 is started, the temperature TIA in the intake port 11 is recorded and stored. In this case, this can be carried out by the temperature sensor 20 or, since the intake air temperature TIA also prevails at the temperature sensor 21 before the internal combustion engine is started (TKST=TIA), may take place by the temperature sensor 21.

After the internal combustion engine 10 has been started and fuel has been injected, the temperature TKST at the temperature sensor 21 is recorded, and the reduction in temperature ΔT is calculated from the value that was obtained before the internal combustion engine was started and the value after injection has taken place. The value ΔT obtained in this way is an input variable for a characteristic diagram KF1 stored in the memory device 17. The factor FKST is read out of the characteristic diagram KF1 as a function of the value ΔT and the time since the internal combustion engine was started. The factor FKST can either be included in the equation (2) or may act exclusively on the basic injection time TI_B, so that optimum warming up of the internal combustion engine is ensured even when fuels of differing quality are used. A condition for this is that there are reproducible conditions during starting of the internal combustion engine (non-steady state), so that the reduction in temperature that is determined is attributable exclusively to the fuel quality and not to changes in other operating parameters.

In the case of steady-state operation of the internal combustion engine (intake air mass, load, ambient temperature approximately constant), the temperature TIA is recorded under these defined conditions by the temperature sensor 20 and is stored. The temperature TKST is recorded by the temperature sensor 21, and the reduction in temperature ΔT is calculated from the value that was obtained before the internal combustion engine was started and the value TKST. The value ΔT obtained in this way, together with a variable which represent the load on the internal combustion engine (air mass, induction pipe pressure), is an intake variable for a characteristic diagram KF2 stored in the memory device 17. The factor FKST is read out of the characteristic diagram KF2 as a function of the values of the input variables. The factor FKST is incorporated in the equation (2), so that optimum warming up of the internal combustion engine is ensured even when the fuel quality varies.

The characteristic diagrams KF1 and KF2 are recorded experimentally by tests.

I claim:

1. A method for detecting a quality of a fuel supplied to an internal combustion engine, which comprises the steps of:
   directing onto a temperature sensor at least some of the fuel injected by an injection valve into an induction pipe of an intake port of the internal combustion engine so that a wall film is formed around the temperature sensor;
   determining a reduction in temperature that occurs as a result of an enthalpy of vaporization, obtaining the reduction in temperature by comparing a first temperature in the intake port of the internal combustion engine and a second temperature at the temperature sensor after the fuel has been injected; and
   determining the quality of the fuel from the reduction in temperature.

2. The method according to claim 1, which comprises using values for the reduction in temperature as input variables for a characteristic diagram in which associated values for a correction factor are stored, the correction factor is taken into account in a calculation of an injection time of the internal combustion engine.

3. The method according to claim 1, which comprises measuring the first temperature in the intake port of the internal combustion engine using a further temperature sensor.

4. The method according to claim 1, which comprises:
   measuring the first temperature in the intake port before the internal combustion engine is started;
   measuring the second temperature using the temperature sensor after injection has taken place;
   calculating the reduction in temperature from a difference between the first temperature and the second temperature; and
   reading-out the associated values for the correction factor from the characteristic diagram in dependence on the values for the reduction in the temperature and a time since the internal combustion engine was started.

5. The method according to claim 1, which comprises during steady-state operation of the internal combustion engine, measuring the first temperature in the intake port;

measuring the second temperature using the temperature sensor after injection has taken place;

calculating the reduction in temperature from a difference between the first temperature and the second temperature; and reading out the associated values for the correction factor from the characteristic diagram in dependence on the reduction in temperature and a load on the internal combustion engine.

6. In a multi-cylinder internal combustion engine having an intake port with a plurality of induction pipes corresponding to a number of injection valves, each respective induction pipe being assigned a respective injection valve for injecting fuel, so that the fuel can be injected into the respective induction pipe, a device for detecting a quality of the fuel supplied to the internal combustion engine, the device comprising:

a plurality of temperature sensors, with one of said temperature sensors disposed in each of said induction pipes, in such a manner that while the fuel is being injected, at least some of the fuel strikes a respective temperature sensor, the respective injection valve and said respective temperature sensor being combined and form a structural unit.

7. In a multi-cylinder internal combustion engine having an intake port with a plurality of induction pipes corresponding to a number of injection valves, each respective induction pipe being assigned a respective injection valve for injecting fuel, so that the fuel can be injected into the respective induction pipe, a device for detecting a quality of the fuel supplied to the internal combustion engine, the device comprising:

a temperature sensor disposed in one of the induction pipes, in such a manner that while the fuel is being injected, at least some of the fuel strikes said temperature sensor, the respective injection valve and said temperature sensor being combined and form a structural unit.

8. The device according to claim 6, wherein the respective injection valve has a holder which extends in a direction of a fuel jet from the respective injection valve and is angled off at a free end, to which said respective temperature sensor is secured.

9. The device according to claim 6, further comprising connection lines being common connection lines connected to both the respective injection valve and said respective temperature sensor.

10. In combination with a multi-cylinder internal combustion engine having an intake port with a plurality of induction pipes corresponding to a number of injection valves, each respective induction pipe being assigned a respective injection valve for injecting fuel, so that the fuel can be injected into the respective induction pipe, a device for detecting a quality of the fuel supplied to the internal combustion engine, the device comprising:

a plurality of temperature sensors, with one of said temperature sensors disposed in each of said induction pipes, in such a manner that while the fuel is being injected, at least some of the fuel strikes a respective temperature sensor, the respective injection valve and said respective temperature sensor being combined and form a structural unit.

* * * * *